United States Patent [19]

Puzey

[11] Patent Number: 5,768,002
[45] Date of Patent: Jun. 16, 1998

[54] LIGHT MODULATION SYSTEM INCLUDING A SUPERCONDUCTIVE PLATE ASSEMBLY FOR USE IN A DATA TRANSMISSION SCHEME AND METHOD

[76] Inventor: Kenneth A. Puzey, 360 Willard Hall, Boulder, Colo. 80310

[21] Appl. No.: 643,642

[22] Filed: May 6, 1996

[51] Int. Cl.$^6$ .................. G02F 1/03; G02F 1/07; G02B 6/36; H01B 12/00

[52] U.S. Cl. .......... 359/245; 359/240; 359/252; 359/320; 359/321; 359/117; 359/124; 385/88; 505/182; 505/181

[58] Field of Search .............. 505/182, 702, 505/828, 848, 866, 181, 183; 359/240, 245, 252, 321, 320, 117, 128, 124, 109; 385/58, 70, 88

[56] References Cited

U.S. PATENT DOCUMENTS

| | | | |
|---|---|---|---|
| 3,499,704 | 3/1970 | Land et al. | 359/320 |
| 4,744,625 | 5/1988 | Lanzisera | 359/305 |
| 4,768,852 | 9/1988 | Ih | 359/287 |
| 5,015,619 | 5/1991 | Wang | 505/160 |
| 5,036,042 | 7/1991 | Hed | 359/838 |
| 5,110,792 | 5/1992 | Nakayama et al. | 359/245 |
| 5,210,637 | 5/1993 | Puzey | 359/245 |
| 5,299,054 | 3/1994 | Geiger | 359/251 |
| 5,328,893 | 7/1994 | Sun et al. | 505/210 |

FOREIGN PATENT DOCUMENTS 07335950  12/1995  Japan.

OTHER PUBLICATIONS

Offside M.J. et al. "Optical Wavelength Converters", Apr. 1, 1995, Electronics and Communication Engineering Journal.

*Primary Examiner*—David C. Nelms
*Assistant Examiner*—Evelyn A. Lester
*Attorney, Agent, or Firm*—Stephen C. Shear

[57] ABSTRACT

A method and apparatus for modulating light, wherein a light source provides light of a certain wavelength to be modulated by a layer of superconducting material which forms part of a specifically configured plate assembly. The superconducting layer is placed in the optical path of the light source. Further the superconducting layer is switched between a partially transparent non-superconducting state and a substantially non-transparent superconducting state by a modulation circuit. The resulting optical pulses transmitted through the superconducting layer are converted from the original wavelength to a lower wavelength by a frequency converting device.

39 Claims, 5 Drawing Sheets

5,768,002

1

LIGHT MODULATION SYSTEM INCLUDING A SUPERCONDUCTIVE PLATE ASSEMBLY FOR USE IN A DATA TRANSMISSION SCHEME AND METHOD

BACKGROUND OF THE INVENTION

The present invention relates generally to fiber optic communication, and more particularly to modulation of light for use with fiber optics in fiber optic communication schemes.

With the advent of dispersion compensating fibers, erbium doped fiber amplifiers, high speed amorphous silicon detectors, and all optical demultiplexing, fiber optic transmission speed is limited principally by the modulation speed of the optical transmitter.

High speed modulators have been invented that take advantage of the properties of superconducting materials. Superconducting materials are in there "superconducting" state if the current density in the material, and the temperature of the material, and the magnetic field around the material are all below certain critical values. The critical current density ($J_c$), critical temperature ($T_c$), and the critical magnetic field ($H_c$) are all dependent on the chemical composition of the material and on the presence or absence of defects and impurities. If any of these quantities rise above the critical values the material leaves its superconducting state and enters its "normal" state. The material has properties similar to a semiconductor in it's normal state and is characterized by a normal-state resistivity. The superconducting state has many of the properties of a theoretically perfect conductor. The electrical resistance is zero and electromagnetic fields are reflected by it. Thus in the superconducting state a superconducting thin film acts like a mirror with 100% reflectivity [1, 2]. In the normal state light is partially transmitted [3]. The bracketed end note reference numbers [1, 2] and all other such end notes and reference numbers cited herein appear at the end of this specification along with the reference notes themselves.

U.S. Pat. No. 5,210,637 which is incorporated herein by reference issued May 11, 1993 to Puzey for "High Speed Light Modulation" discloses a device for the high speed modulation of light wherein a layer of superconducting film is used to modulate the light. U.S. Pat. No. 5,036,042 which is incorporated herein by reference issued Jul. 30, 1991 to Hed for "Switchable Superconducting Mirrors" and discloses a device that can be used for the high speed modulation of light.

FIG. 1 herein illustrates one embodiment of U.S. Pat. No. 5,210,637 as indicated by reference numeral 10. A DC power supply 15 is connected to a light source 13 to provide constant light output. A superconducting film 14 is placed in the path of the optical output and its reflectivity is altered by a modulating circuit 16 which switches the film between its superconductivity and non-superconductive states, as described In the Puzey patent. The altered reflectivity results in optical pulses 20 which are carried away by an optical fiber 25. The superconducting film is kept cool by placing it in a dewar 22 which is cooled by means of a refrigerating device 26.

A key drawback of device 10 and the corresponding device in the Hed Patent is that they are both limited to creating optical pulses in the far infrared range (approximate wavelength of 14 microns). This is because at higher frequencies the photon energy of the light is high enough to break the binding energy of the Cooper electron pairs responsible for the phenomena of superconductivity. In

2 order for the device to work properly the photon energy of the light must be less than the binding energy (or energy gap) of the cooper pairs. This relation is given by the formula below:

$$h\nu < 2\Delta \quad \{1\}$$

Where h is Planck's constant, v is the frequency of light, and $2\Delta$ is the energy gap of the superconductor. The energy gap of the superconductor can be found from Mattis-Bardeen [4].

$$2\Delta = 8kT \quad \{2\}$$

Where k is Boftzman's constant, and T is the critical temperature of the superconducting material. High critical temperature Thallium compounds have critical temperatures around 128 Kelvin. Plugging this into equations {1} and {2}, the operation of the device is limited to light with a wavelength around 14 microns.

The attenuation of light in silica glass fiber (the most common material for long haul fibers) can be calculated from the formula below.

$$\alpha = Ae^{-/\lambda} + B/\lambda^4 \quad \{3\}$$

Where $\alpha$ is the attenuation; A, a, and B are constants that are material dependent. $\lambda$ is the wavelength. The attenuation of 14 micron light in silica glass fiber is approximately $7.32 \times 10^{10}$ dB per km using formula {3} and data from reference [5]. Therefor, applicant has found that the attenuation of 14 micron light in glass fiber is to high to be useful for telecommunication. Modern telecommunication systems are optimized for wavelengths around 1.3 or 1.55microns and have attenuation around 0.15 dB per km. Unfortunately, light at these wavelengths (i.e. at these higher photon energies) are not compatible with the devices described in the Puzey and Hed Patents. The present invention to be described hereinafter provides a solution to this problem which has remained unsolved since as long ago as December 1988, the filing date of the '042 Hed patent.

SUMMARY OF THE INVENTION

The present invention provides an apparatus and method for the modulation of light. A layer of superconducting material is placed in the optical path of a light source. The light source emits light with a wavelength which in a preferred embodiment is long enough that the energy of the individual photons is less than the superconducting gap of the superconductor. At least a portion of the superconducting layer is then switched between a substantially non-transparent superconducting state and a partially transparent non-superconducting state by predetermined means. The optical pulses transmitted through the portion of the superconducting layer are then converted from the original wavelength to a different wavelength, a shorter wavelength in the preferred embodiment, by a frequency converting device. The shorter wavelength in the preferred embodiment has been chosen to allow an optical fiber to efficiently carry the optical pulses without significant attenuation or dispersion.

In a specific embodiment of the present invention, the predetermined switching means is designed for switching a particular portion of the superconducting layer between its superconducting and non-superconducting states using a modulating circuit that intermittently raises the current density in the particular portion above the critical current density of the superconducting material, or raises the magnetic field of the portion above the critical field of the superconducting material, or raises the temperature of the portion above the critical temperature of the superconducting material. The frequency converting device can be a parametric amplifier, parametric oscillator, Nth harmonic generator, four wave mixer, frequency upconverter, or any other frequency converting device. Means for keeping the superconducting layer below its critical temperature can be provided by placing the device in a dewar where at least a portion of the dewar is transparent to the longer wavelength and the dewar is actively cooled by a cryogenic refrigerator.

The present invention may also include certain other features described below. The present invention can include an optical fiber, optically coupled to the frequency converting device to conduct the optical pulses away from the device, for example to a receiver, optical demultiplexer, or other useful device. The present invention can include a number of fiber optic links used to provide input data for the modulating circuit. This is useful because glass optical fibers conduct less heat than metal electrical wires. Alternatively, free space optical links may be used to provide data to the modulating circuit, eliminating a heat conducting path into the dewar all together.

It is an object of the present invention to provide an improved light modulation device which increases the range of wavelengths which can be modulated at an increased rate.

It is another object of the present invention to increase the rate at which data bits can be transmitted on a fiber optic link.

It is another object of the present invention to create high speed optical pulses that are not limited to wavelengths with photon energies lower than the superconducting gap of the superconducting material.

It is an object of the present invention to reduce the amount of heat introduced by incoming data sent to the modulating circuit.

The foregoing and other objects, features, and advantages of the invention will be apparent from the following more particular description of the preferred embodiment of the invention as illustrated in the drawings.

DETAILED DESCRIPTION

Figure 1:
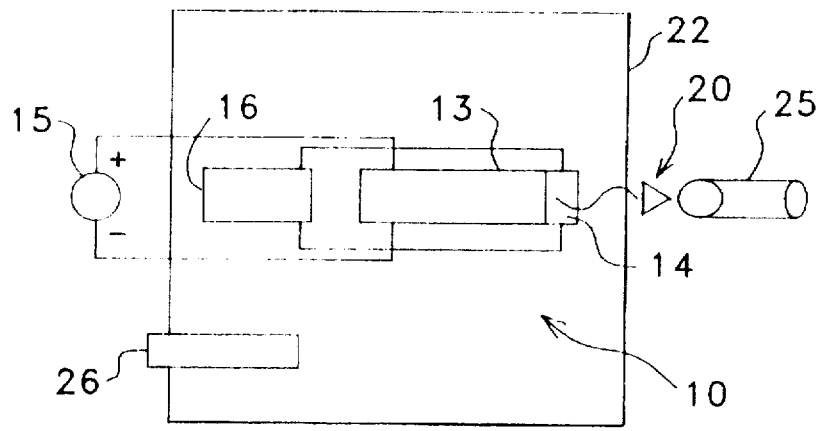
FIG. 1 is a diagrammatic illustration of a prior art light modulation device employing superconducting material.
Figure 2:
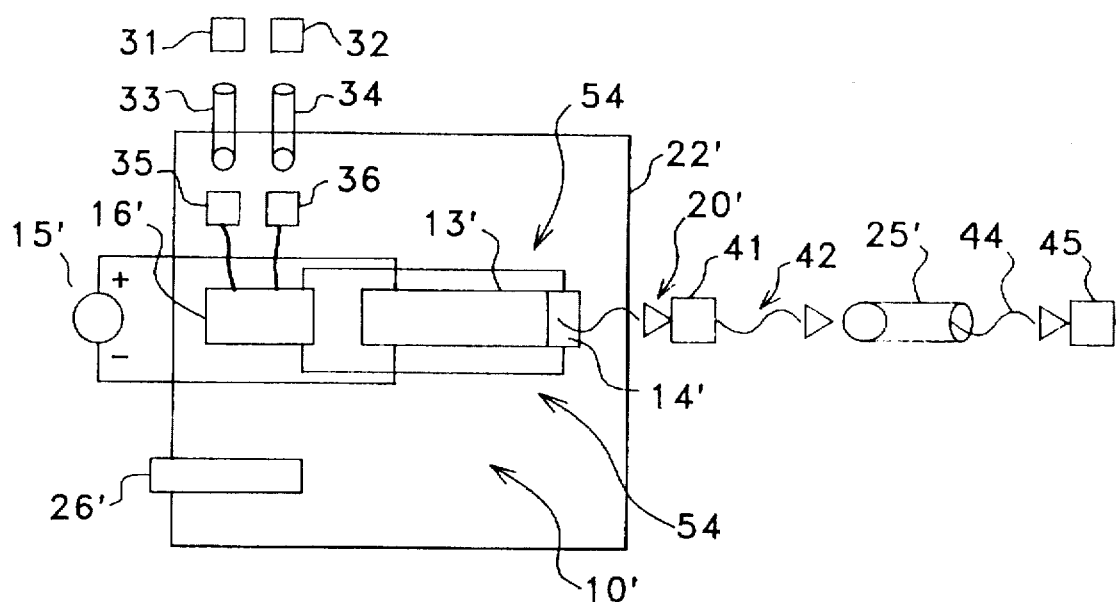
FIG. 2 is a diagrammatic illustration of a light modulating system designed in accordance with the present invention and employing a superconducting layer and a frequency converting device to modulate light.

Turning to the drawings, attention is immediately directed to FIG. 2, inasmuch as FIG. 1 was discussed above. FIG. 2 shows a light modulation system 10' designed in accordance with one embodiment of the present invention. This system includes most of the components described above in conjunction with FIG. 1 (designated by the same reference numbers primed) plus additional components to be described hereafter. With particular regard to the superconducting arrangement 14', as stated in the Puzey patent electrical current of a certain minimum critical level can be used to switch superconducting arrangement 14' from its superconducting state to the normal state. Removing the electrical current allows arrangement 14' to return to its superconducting state. When the current is below the critical current, the arrangement 14' is in the superconducting state and the optical output 20' is zero because of the 100% reflectance. When the current is above the critical current the material is in the normal state and the optical output 20' is non-zero, that is some measurable level. Thus electrical current pulses can be used to amplitude modulate the light from an optical source 13'. Note that this modulator has the ideal extinction ratio of zero.

Still referring to FIG. 2, in system 10', a plurality of fiber optic transmitters 31 and 32 are arranged to transmit light pulses in parallel to a plurality of receivers 35 and 36 through individual optical fibers 33 and 34, see Van Zehgbroeck [6]. The optical transmitters 31 and 32 may be current modulated laser diodes or LEDs. The receivers 35 and 36 may be MSM (metal semiconductor metal) detectors. The electrical data from the signals are then read in parallel and serialized via a high speed shift register 16'. The shift register is made from Josephson Junction circuitry, see Martens et. al. [7]. A light source 13' is used to generate light which is then amplitude modulated by arrangement or device 14' under the control of the serialized signals from the shift register 16'. Electrical energy is supplied to the light source 13' by a power supply 15'. The light source 13' may be an LED, laser, etc., as is commonly known in the art. The modulating device 14' will be described in more detail later.

The optical pulses 20' from the modulating device 14' enter a frequency converting device 41 which replicates the incoming pulses 20' in a different frequency of light 42 in accordance with one feature of the present invention. The frequency converting device 41 may be a parametric amplifier, parametric oscillator, Nth harmonic generator, four wave mixer, frequency upconverter, etc., some of the principles of which are described in Yariv [8] and Saleh and Teich [9]. The frequency converting device 41 should be made from material that is transparent at the wavelength of the modulated light 20' and the desired wavelength of the outgoing pulses 42, and has a high nonlinear conversion efficiency. The incoming pulses 20' are preferably on the order of 14 microns so as to be compatible with superconducting device 14'. The outgoing pulses 42 are on the order of about 0.5 to 2 microns, preferably on the order of 1.3 or 1.5 microns so as to be compatible with silica glass fibers. Suitable materials for the frequency converting device 41 are $GaAs$, $ZnGeP_2$, $AgGaSe_2$, $Tl_3AsSe_3$, $CdSe$, $AgGaS_2$, $Ag_3AsS_3$. These new pulses 42 then enter an optical fiber 25' which carries the pulses and is typically made of silica glass. The pulses 44 exiting the fiber are then received by an optical receiver 45. By way of illustration and not limitation, the optical receiver 45 may be a high speed amorphous silicon detector or an all optical demultiplexer and a plurality of low speed detectors. Such techniques have resulted in 100 Gb/s receiver capability, see Ronson et. al. [10].

A dewar 22' is used in accordance with another feature of the invention to thermally isolate the device 14' and shift register 16' from the outside room temperature. The dewar 22' must be at least partially transparent to the optical energy 20' or have a window that is substantially transparent to the optical energy 20'. A second window could be used to direct pulses to detectors 35 and 36 in lieu of optical fibers 33 and 34 which extend into the dewar or the dewar could be entirely transparent. A cryogenic cooler 26' is used to keep the temperature in the dewar below the critical temperature. The cryogenic cooler may be a sterling cycle refrigerator, Gifford-McMahon refrigerator, tank of liquid nitrogen, etc.

FIGS. 3A–3H show an embodiment of the superconducting arrangement 14'. The modulator 14' is made by depositing a thin superconducting layer 50 on a transparent or partially transparent substrate 49 such as silicon or diamond [11]. A film thickness of 480 angstroms transmits 6% of the incident light [3]. The critical current of the film depends on the product of the width, thickness, and critical current density. For a 480 angstrom thick layer with a 100 micron bridge width and a critical current density of 10,000 Amps per square centimeter the critical current would be 480 micro Amps. This switch current would lead to dissipative heating of about 96 nW for the same bridge 100 microns long with a normal resistivity of 200 micro Ohms per centimeter. The switching speed of the film is limited by Abrikosov vortices nucleation. The modulation speed is given by [12].

$$t_{s-n} = 3 t_D (W/2\Omega)(I_c/I)^2, \qquad (4)$$

where $t_{s-n}$ is the superconducting to normal switching time, $t_D$ is the order parameter relaxation time, W is the bridge width, $\Omega$ is the depairing ratio, $I_c$ is the critical current, L is the switching current. Kozyrev estimates $t_{s-n}$ to be on the order of a picosecond for a 70 micron bridge. The FWHM spectral width of a transform limited pulse is the reciprocal of the FWHM temporal width. For a pulse width of about a ps this gives a spectral width of a nanometer or so.

Figure 3A:
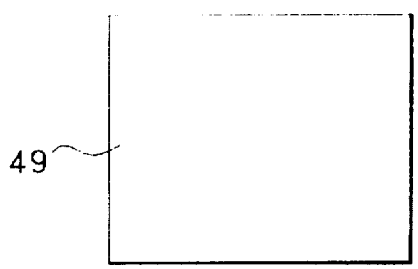
FIGS. 3A–3H are detailed enlarged, not to scale diagrammatic illustrations of one embodiment of the superconducting layer shown in FIG. 2.
Figure 3B:
Figure 3C:
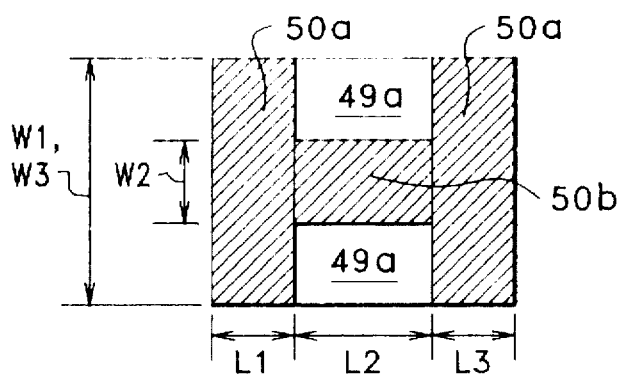
Figure 3D:
Figure 3E:
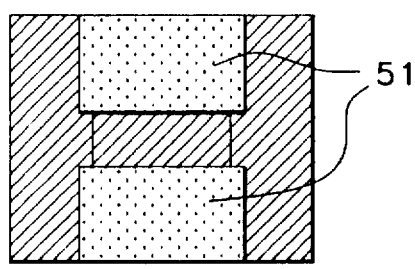
Figure 3F:
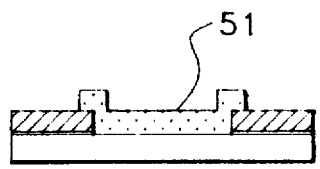
Figure 3G:
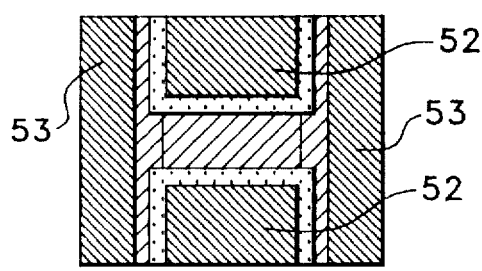
Figure 3H:
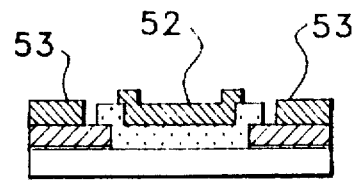
Figure 4A:
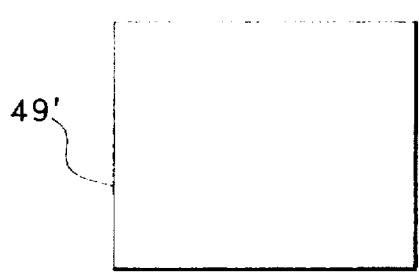
FIGS. 4A–4H are detailed enlarged, not to scale diagrammatic illustrations of an alternative embodiment of the superconducting layer shown in FIG. 2.
Figure 4B:
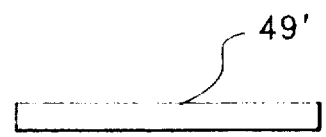
Figure 4C:
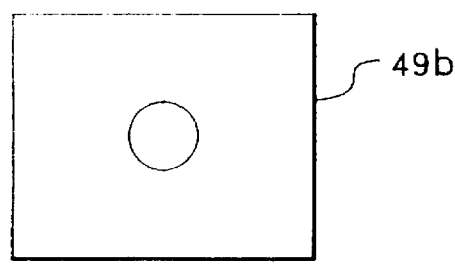
Figure 4D:
Figure 4E:
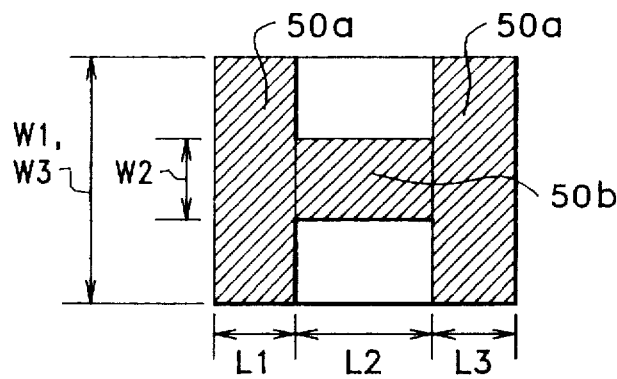
Figure 4F:
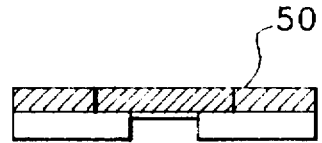
Figure 4G:
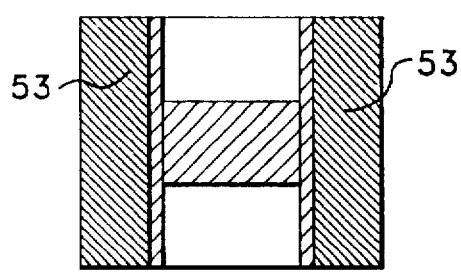
Figure 4H:
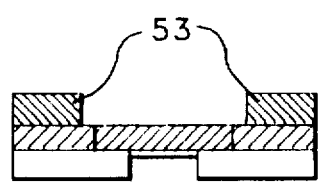

Still referring to FIG. 3A–3H, substrate 49 which is at least partially transparent to the optical pulses 20' is used to support the thin film of superconducting material 50 which is H shaped so as to include legs 50a and a bridge 50b. At the same time, segments 49a of substrate 49 remain exposed in FIG. 3C. A dielectric layer 51 is used to electrically isolate the superconducting layer 50 from a reflective layer 52 which covers segments 49a along with most of layer 51 as best seen in FIGS. 3G and 3H. A conducting layer 53 which is elongated in configuration is placed over and in direct contact with each leg 50A of material 50 and is used to provide electrical contact to the device 14'. The substrate 49 may be made from MgO, silicon, diamond, etc. The superconducting layer 50 may be made from niobium, yttrium, thallium, or mercury based superconductors. Preferably the superconducting layer 50 is made from a superconducting material with a high critical temperature, low normal resistivity, and low critical current density. The dielectric layer 51 may be composed of silicon dioxide, spin on glass, polyimide, etc. The reflective layer 52 is composed of a material that reflects optical energy 20' such as gold, copper, silver, metal, good conductors, etc. The reflective layer 52 prevents light from "leaking" around the superconducting bridge 50b. The conducting layers 53 are used to make a good electrical contact between the shift register 16' and the superconducting layer 50 via leads 54. The conducting layer 53 may be the same material used for the reflecting layer 52. The conducting layer 53 should have low electrical resistance and be substantially unreactive. Gold is a suitable material for both the reflecting layer 52 and conducting layer 53.

Superconducting material only superconducts when the temperature of the material is below a certain temperature (called the critical temperature) and the magnetic field passing through the material is below a certain value (called the critical magnetic field) and the electrical current density passing through the material is below a certain value (called the critical current density). Raising any of these three parameters above the critical value causes the superconductor to enter a non-superconducting state. In the superconducting state the superconducting material 50 is very conductive and thus highly reflective. Electromagnetic energy is reflected in this state. In the non-superconducting state the superconducting material 50 has properties similar to a semiconductor.

Figure 2A:
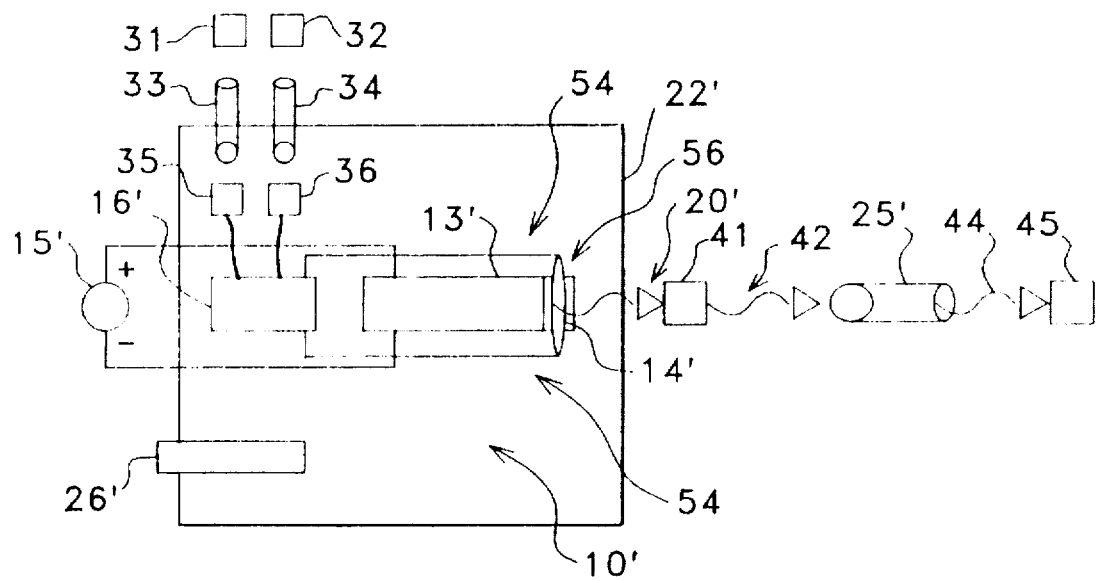
FIGS. 2A and 2B are diagrammatic illustrations of modified light modulating systems designed in accordance with the present invention.
Figure 2B:
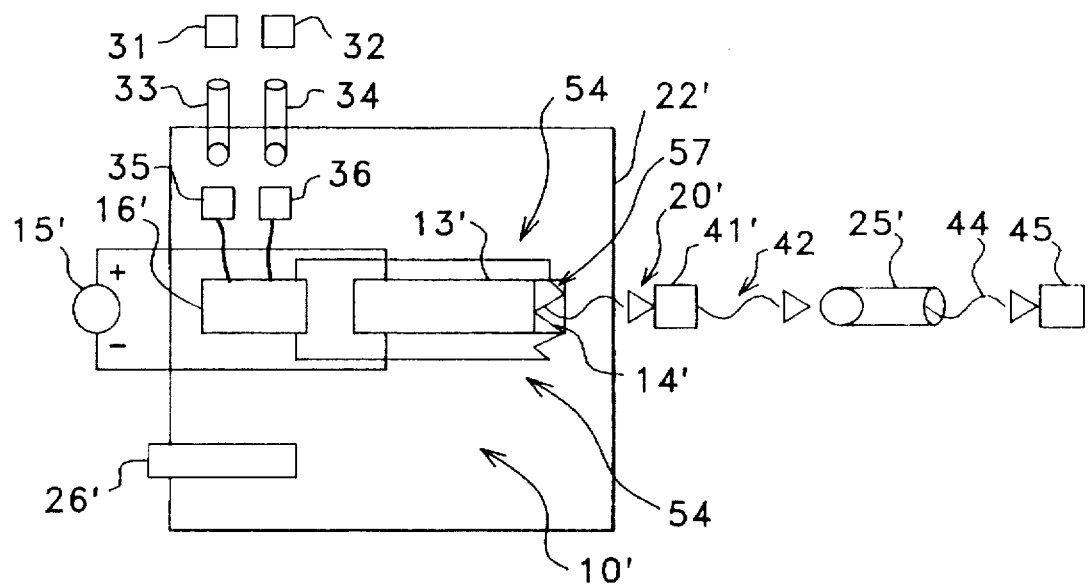

FIG. 2, which has been described, illustrates the use of the critical current density to control device 14'. FIGS. 2A and 2B illustrate the use of a critical magnetic field and a critical temperature respectively to control the superconducting device 14'. Referring to FIG. 2A, element 56 is a magnetic coil which is placed in proximity to device 14'. This magnetic coil 56 when provided with electrical current from shift register 16 via leads 54 raises the magnetic field above the critical magnetic field of material 50 causing it to enter a non-superconducting state. Removal of the current from shift register 16 allows the material 50 to re-enter a superconducting state. Similarly referring to FIG. 2B, element 57 is a resistor or other heating element placed in close proximity to device 14'. This resistor 57 heats the material 50 above its critical temperature when provided with electrical current from shift register 16 via leads 54. Removal of the current from shift register 16 allows the material 50 to re-enter its superconducting state. In the non-superconducting state electromagnetic energy can be transmitted through the material 50. In the superconducting state material 50 substantially blocks transmission. Thus by placing the superconducting layer 50 in the path of the light from the light source 13' the superconducting layer 50 can be used to control the transmission or reflection of light under the influence of the electrical signals from the shift register 16'. Recall that light is an electromagnetic wave.

An alternative embodiment of the modulating device 14' is shown in FIGS. 4A–4H. A substrate 49' that is substantially opaque to the optical energy 20' is used to support H shaped superconducting layer 50. Substrate 49' may be either highly reflective or absorptive. The substrate 49' may be made from sapphire, lanthanum aluminate, gallium arsenide, or the like. The superconducting material may be any superconducting compound such as the niobium, yttrium, thallium or mercury based superconductors. An area 49c of the substrate under the bridge 50b of superconducting material 50 is at least partially removed to allow optical energy 20' to be transmitted through this area 49c. The substrate material may be removed by ion milling, chemical etching, drilling, etc. A conducting layer 53 is used to provide a low resistance electrical contact between the legs 50a of superconducting layer 50 and the shift register 16' as before.

Returning to FIG. 2, the addition of the frequency converting device 41 allows the present system to overcome the problem of large attenuation described above. A parametric amplifier as device 41 can be used to take the high speed pulses 20' at 14 microns and convert them to high speed pulses 42 at a wavelength with lower attenuation and dispersion characteristics (such as 1.3 microns or 1.55 microns). Parametric amplifiers are capable of reproducing even femtosecond pulses. Other devices may be used to perform this frequency conversion as mentioned earlier.

Using the fiber optic arrangement (31, 32, 33, 34, 35, 36) to communicate signals to be multiplexed reduces heat loss as glass does not conduct as much heat into the dewar as copper electrical wires would. In addition, the fiber optic arrangement has better bandwidth, lower crosstalk, and avoids ground-level feed through. An alternative embodiment that eliminates the optical fibers 33 and 34 is also advantageous. A free space optical communication link is established through the transparent dewar (or a transparent window of the dewar). This eliminates heat loss because there is no physical link to carry heat into the dewar. A vertical cavity surface emitting laser (VCSEL) array and charged coupled device (CCD) array would be especially desirable in this type of arrangement.

Returning to FIGS. 3A–3H and 4A–4H the "H" configuration of the superconducting layer 50 provides several advantages. The two legs 50a of the H shape allow for low resistance electrical contact with the shift register 16'. The narrower bridge 50b part of the H allows this part of the superconducting layer to switch faster. The switching speed is linearly related to the width of the bridge as shown by equation {4}. In addition, the narrower bridge reduces the amount of current required to switch the switch to its partially transparent non-superconducting state. This reduces the dissipative heating in the switch.

A more detailed explanation of the current flow through the modulating device 14' is given below. The following dimensions concern the superconducting layer 50.

W1 is the width of the first contact segment 50a.

L1 is the length of the first contact segment 50a.

T1 is the thickness of the superconducting thin film in the first contact segment 50a.

W2 is the width of the light impinging segment 50b.

L2 is the length of the light impinging segment 50b.

T2 is the thickness of the superconducting thin film in the light impinging segment 50b.

W3 is the width of the second contact segment 50a.

L3 is the length of the second contact segment 50a.

T3 is the thickness of the superconducting thin film in the second contact segment 50a.

A good conductor (such as gold) is deposited on the surface of the first and second contact segments 50a. The layer of gold should at least partially cover the surface area of the superconductor defined by (W1×L1) for the first contact segment and (W3×L3) for the second contact segment. This provides a low resistance contact to the superconducting layer.

The critical current density J is defined by the electrical current 1 flowing through a cross sectional area (W1×L1) A Initially the current flows substantially vertically through the area defined by the gold-superconductor contact. Then the current travels substantially in a horizontal direction through a cross section of area (W1×T1). The current then enters the light impinging segment 50b. In at least one embodiment the width w2 of the cross sectional area of the light impinging segment 50b is substantially smaller than the width w1 of the contact segment 50a and the thickness of the films are the same (T1=T2). Thus the cross sectional area A in the light impinging segment 50b (W2×T2) is smaller and since 1 is conserved J increases. This increase in J is due to the restriction of the cross sectional area and causes the light impinging segment to enter its non-superconducting state at a lower electrical current than the contact segments. The electrical current then moves into the second contact segment traveling substantially in a horizontal direction through a cross sectional area (W3×T3). The current then moves substantially in a vertical direction into the gold through the area where the gold and superconductor are in contact. This area at least partially covers (W3×L3).

In addition, the present system is compatible with wave division multiplexing (WDM) and soliton transmission.

Figure 5:
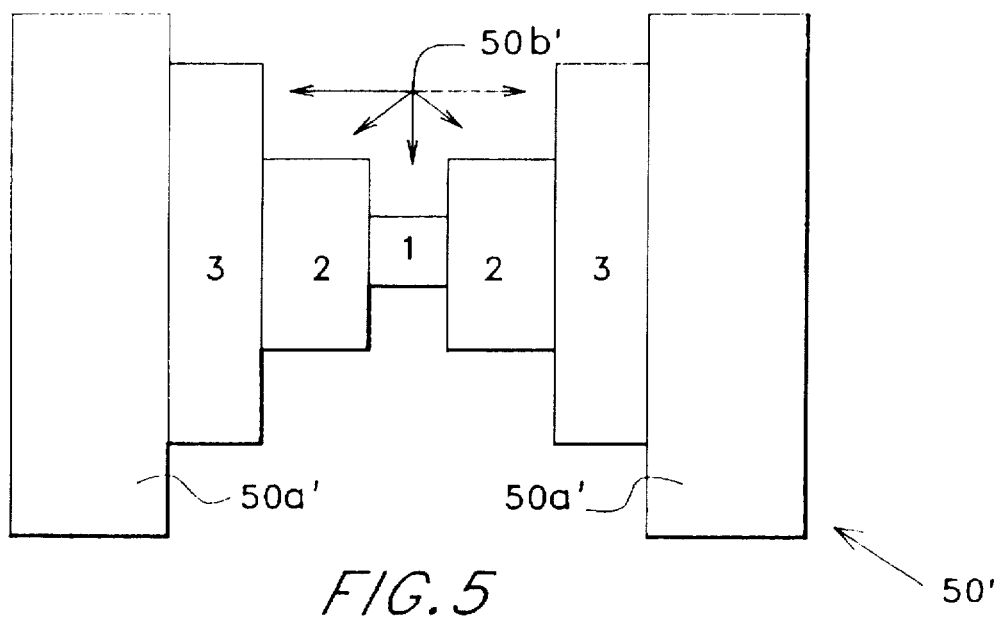
FIG. 5 is a diagrammatic illustration of an alternative embodiment for the superconducting layer.

Another alternative embodiment of the present invention uses different shapes in the light impinging section of layer 50 to allow for discrete regions to switch. An example of this is shown in FIG. 5 which illustrates a modified H shaped configuration 50'. Here the legs of the H shape 50a' serve as contact areas in the same manner as legs 50a. The bridge 50b' is divided into discrete sections 1, 2 and 3, as shown. This allows amplitude shift keying (ASK). ASK allows a single pulse to carry multiple bits of information. By way of illustration and not limitation, when the electrical current passing through the superconducting layer is low, the light output is zero and this can be used to represent the bit string "00". Notice that section 1 has the most restricted width and therefore constricts the electrical current to a smaller cross sectional area increasing the critical current density in this region for a given amount of electrical current. The current can then be raised to a level just high enough to cause section 1 (but not the other sections) to enter its non-superconducting state, allowing only the light impinging section 1 to pass light. This small amount of light could be used to represent the bit string "01". An even higher current could cause section 2 and section 1 to enter its non-superconducting state. Then only light impinging section 1 and 2 would pass light. This greater amount of light could be used to represent the binary string "10". Finally an even greater current could be used to cause section 3 to enter its non-superconducting state, preferably this current is not high enough to cause section 50a' (the contact section) to switch. Light would then pass through sections 1, 2, and 3 which could be used to represent the binary string "11". Thus current pulses with different magnitude can be used to create light pulses with different magnitude.

Figure 6A:
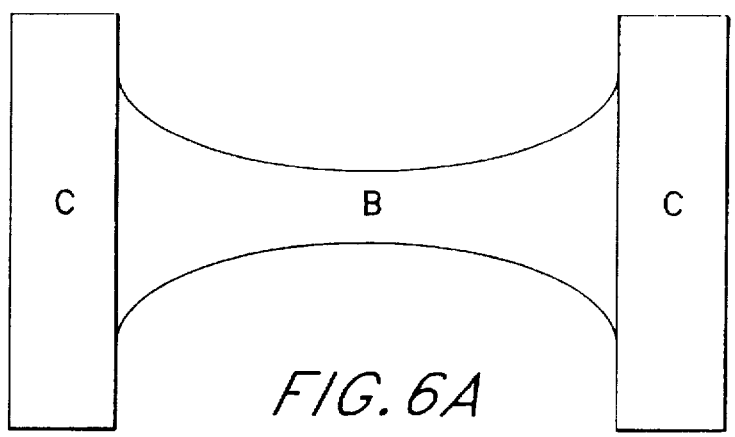
FIGS. 6A and 6B are diagrammatic illustrations of still other alternative embodiments of the superconducting layer.
Figure 6B:
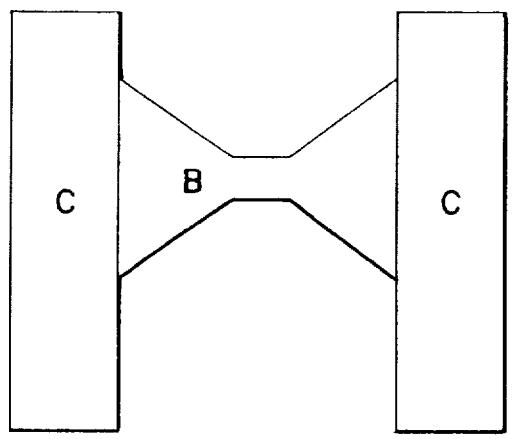

Yet another alternative embodiment of the present invention uses different shapes in the light impinging segment to allow for continuous regions to switch, examples of which are shown in FIGS. 6A and 6B. This allows analog control of the light amplitude sent. It can be seen from FIGS. 6A and 6B that the amount of area in section B that is in its non-superconducting state increases with an increase in the current passing through the superconducting layer. Thus the amount of light allowed to pass through the superconducting layer is proportional to the current passing through the superconducting layer and can be varied in a continuous or analog manner.

REFERENCES

1. Collins, R. T. et.al. "Infrared Studies of the Normal and Superconducting States of $YBa_2Cu_3O_{7-x}$." *IBM Journal of RES.&DEV.* vol.33, no.3, May 1989, pgs 238–244.

2. Schlesinger, Z et.al. "Infrared Studies of the Superconducting Energy Gap and Normal-State Dynamics of the high-$T_c$ Superconductor $YBa_2Cu_3O_7$." *Physical Review B*, vol. 41, no. 16, Jun. 1, 1990, pgs 11237–11259.

3. Tanner, D. B. "Far-Infrared Transmittance and Reflectance Studies of Oriented $YBa_2Cu_3O_7$." *Physical Review B*, vol. 43, no. 13, May 1, 1991, pgs 10383–10389.

4. Mattis, D. C., Bardeen J. *Phys Rev* 111, 412 (1958).

5. Lines, M. E., Nassau K. "calculations of scattering loss and dispersion related parameters for ultralow-loss optical fibers." *Optical Engineering* vol. 25 no.4, April 1986, Pgs 602–607.

6. Van Zoeghbroeck, B. "Optical Data Communication between Josephson-Junction Circuits and Room-Temperature Electronics." *IEEE Transactions on Applied Superconductivity*, Vol.3, No. 1, March 1993, pgs 2881–2884.

7. Martens, Jon S. et. al. "High-Temperature superconducting shift registers operating at up to 100 Ghz." *IEEE Journal of Solid State Circuits*, Vol. 29, No. 1, January 1994, pgs 56–62.

8. Yariv, A. *Optical Electronics*, 4th edition, chapter 8, HRW press 1991.

9. Saleh & Teich, *Photonics*, chapter 19.

10. Ronson, K. et.al. "Self-Timed Integrated-Optical Serial-to-Parallel Converter for 100 Gbit/s Time Demultiplexing.", *IEEE Photonics Technology Letters*, Vol. 6 No. 10, October 1994, pgs 1228–1231.

11. Harshavardhan, K. S. "High $T_c$ Thin Films Deposited by PLD onto Technologically important Substrates." *AIP Conference Proceedings* 288 New York, AIP Press, 1994, pgs 607–612.

12. Kozyrev, A. B. "Fast Current S-N Switching in $YBa_2Cu_3O_{7-x}$ Films and It's Application to an Amplitude Modulation of Microwave Signal." *Sverkhprovodimost* April 1993, pgs 655–667.

What is claimed is:

1. A light modulation system, comprising:
   (a) a light modulating device having an output and providing at its output a train of light pulses, each of which has a certain wavelength, said light modulating device including
      (i) a source of light having said certain wavelength,
      (ii) a layer of superconductive material through which light from said source must pass before it can reach the device's output, said superconductive material being switchable between a superconducting state in which said light can not pass and a non-superconducting state in which said light can pass, and
      (iii) an arrangement for switching said superconducting material between its superconducting and non-superconducting states in a way which provides said light pulses at the output of the device; and
   (b) a wavelength changing device optically coupled to the output of said light modulating device for changing the wavelength of said pulses.

2. A light modulation system according to claim 1 including a fiber optic link optically coupled to said wavelength changing device for receiving said wavelength changed light pulses and directing them away from the wavelength changing device, wherein the minimum wavelength of the light from said source is limited by the ability of said superconductive material to act on the light in a way that produces said pulses as a result of the material being switched between its superconductive and non-superconductive states and wherein the change in wavelength caused by said wavelength changing device is dependent on the ability of said fiber optic link to efficiently carry said pulses without significant attenuation or dispersion.

3. A light modulation system according to claim 2 wherein the wavelength of said light source is no less than approximately 2 microns and wherein said wavelength changing device reduces the wavelength of said pulses to between approximately 0.5 and 2 microns.

4. A light modulation system according to claim 1 wherein said arrangement for switching said superconductive material between its superconducting and non-superconducting states includes means for providing input pulses of light, at least one detector for detecting said input pulses and means for switching said superconducting material between its superconducting and non-superconducting states in response to and depending upon the detected input pulses.

5. A light modulation system according to claim 4 including a fiber optic link optically coupled to said wavelength changing device for receiving said wavelength changed light pulses and directing them away from the wavelength changing device.

6. A light modulation system according to claim 5 wherein the minimum wavelength of said light source is no less than approximately 2 microns and wherein said wavelength changing device reduces the wavelength of said pulses to between approximately 0.5 and 2 microns.

7. A light modulation system according to claim 1 wherein said arrangement for switching said superconducting material between its superconducting and non-superconducting states includes means for exposing magnetic fields to said superconducting material in predetermined ways so as to switch said material between said states to provide said light pulses.

8. A light modulation system according to claim 1 wherein said arrangement for switching said superconducting material between its superconducting and non-superconducting states includes means for subjecting said superconducting material to temperature variations in predetermined ways so as to switch said material between said states to provide said light pulses.

9. A light modulation system according to claim 1 wherein said arrangement for switching said superconducting material between its superconducting and non-superconducting states includes means for directing an electrical current through said superconducting material in predetermined ways so as to switch at least a portion of said material between said states to provide said light pulses.

10. A light modulation system according to claim 9 wherein said superconductive material includes first and second contact segments and a third light impinging segment, all of which are electrically connected together, wherein said light modulating device further includes means for preventing light from said source from reaching the output of said light modulating device by passing through said contact segments of said superconductive material irrespective of its superconducting or non-superconducting states while allowing said material to pass light through its light impinging segment and reach said output when the material is in its non-superconducting state, and wherein said means for directing current through said material includes an electrical circuit including said contact and light impinging segments of superconductive material such that the electrical current first passes through one of said contact segments, then through said light impinging segment and thereafter through the other contact segment.

11. A light modulation system according to claim 10 wherein said light preventing means includes means located either in front of or behind said first and second contact segments for phyically preventing said light from said source from reaching the output of said light modulating device.

12. A light modulation system according to claim 9 wherein said superconductive material includes first and second contact segments and a third light impinging segment, all of which are electrically connected together, wherein said means for directing current through said material includes an electrical circuit including said contact and light impinging segments of superconductive material such that said electrical current first passes through one of said contact segments, then through said light impinging segment and thereafter through the other contact segment in a predetermined way, and wherein said first and second contact segments and said third light impinging segments are configured such that when a current of a predetermined magnitude passes through said first, second and third segments in said predetermined way when the latter are in their respective superconducting states, only said third light impinging segment switches to its non-superconducting state in response thereto, whereby light from said source reaches the output of said light modulating device though said third segment only.

13. A light modulation system according to claim 12 wherein the surface area defined by each of said contact segments of said superconductive material is larger than the surface area defined by said light impinging segment.

14. A light modulation system according to claim 10 wherein said contact and light impinging segments together define an H-shaped configuration where said light impinging segment serves as the cross-bar of the H-shape.

15. A light modulation system according to claim 14 wherein said electrical circuit includes first and second electrical contacts respectively connected to said first and second contact segments, each of said contacts extending parallel to and the length of but being thinner than its respective contact segment.

16. A light modulation system according to claim 14 wherein said device includes a light opaque support plate having one surface thereof for supporting said H-shaped superconductive material and at least in part serving as said light preventing means, said support plate including means for allowing light passing through the light impinging segment of said superconductive material to pass through the plate also and reach the output of said light modulating device.

17. A light modulation system according to claim 9 wherein said superconductive material includes first and second contact segments and a third light impinging segment, all of which are electrically connected together, wherein said means for directing current through said material includes an electrical circuit including said contact and light impinging segments of superconductive material such that said electrical current first passes through one of said contact segments, then through said light impinging segment and thereafter through the other contact segment in a predetermined way, and wherein said first and second contact segments and said third light impinging segments are configured such that when a current of a different magnitudes pass through said first, second and third segments in said predetermined way when the latter are in their respective superconducting states, certain different portions of at least said third light impinging segment respectively switch to their non-superconducting state depending upon the magnitude of said current, whereby light from said source reaches the output of said light modulating device through the switched portion or portions of said third segment.

18. A light modulation system according to claim 17 wherein said different current magnitudes include a first current magnitude and a second higher current magnitude and wherein said different portions of said third segment include a first portion and a second larger portion which includes said first portion.

19. A light modulation system according to claim 17 wherein said different current magnitudes include a first current magnitude and a second higher current magnitude and wherein said different portions of said third segment include a first portion and a second distinctly different portion.

20. A data transmission system, comprising:

(a) a light modulating device having an output and providing at its output a train of light pulses containing data, each pulse of which has a wavelength of at least about 2 microns, said light modulating device including
 (i) a source of light having said wavelength of at least about 2 microns,
 (ii) a layer of superconductive material through which light from said source must pass before it can reach the device's output, said superconductive material being switchable between a superconducting state in which said light can not pass and a non-superconducting state in which said light can pass, and
 (iii) an arrangement for switching said superconducting material between its superconducting and non-superconducting states in a way which provides said data containing light pulses at the output of the device;

(b) a wavelength changing device optically coupled to the output of said light modulating device for reducing the wavelength of said pulses to a wavelength between approximately 0.5 and 2 microns; and (c) a fiber optic link optically coupled to said wavelength changing device for receiving said wavelength changed light pulses and directing them away from the wavelength changing device for further transmission, said optical link being constructed of a material which efficiently directs light therethrough when the light has a wavelength between about 0.5 and 2 microns.

21. A light modulation system according to claim 20 wherein said arrangement for switching said superconductive material between its superconducting and non-superconducting states includes means for providing input pulses of light, at least one detector for detecting said input pulses and means for switching said superconductive material between its superconducting and non-superconducting states in response to and depending upon the detected input pulses.

22. A light modulation system according to claim 21 wherein said means for switching said superconducting material between its superconducting and non-superconducting states includes means for directing an electrical current through said superconducting material in predetermined ways so as to switch a portion of said material between said states to provide said light pulses.

23. A light modulation system according to claim 22 wherein said superconductive material includes first and second contact segments and a third light impinging segment, all of which are electrically connected together, wherein said means for directing current through said material includes an electrical circuit including said contact and light impinging segments of superconductive material such that said electrical current first passes through one of said contact segments, then through said light impinging segment and thereafter through the other contact segment in a predetermined way, and wherein said first and second contact segments and said third light impinging segments are configured such that when a current of a predetermined magnitude passes through said first, second and third segments in said predetermined way when the latter are in their respective superconducting states, only said third light impinging segment switches to its non-superconducting state in response thereto, whereby light from said source reaches the output of said light modulating device through said third segment only.

24. A light modulation system according to claim 23 wherein the surface area defined by each of said contact segments of said superconductive material is larger than the surface area defined by said light impinging segment.

25. A light modulation system according to claim 24 wherein said contact and light impinging segments together define an H-shaped configuration where said light impinging segment serves as the cross-bar of the H-shape.

26. A light modulating means according to claim 25 wherein said electrical circuit includes first and second electrical contacts respectively connected to said first and second contact segments, each of said contacts extending parallel to and the length of but being thinner than its respective contact segment.

27. A light modulation system according to claim 25 wherein said device includes a light opaque support plate having one surface thereof for supporting said H-shaped superconductive material and at least in part serving as said means for preventing light from said source from passing through said contact segments of said superconductive material irrespective of its states, said support plate including means for allowing light passing through the light impinging segment of said superconductive material to pass through the plate also.

28. A light modulation system according to claim 22 including means defining a dewar around said superconductive material such that the superconductive material is thermally isolated from the ambient surroundings and from said means for providing said input pulses of light.

29. A superconductive plate assembly for use in a light modulation system which includes a light modulating device having an output and providing at its output a train of light pulses, each of which has a certain wavelength, said light modulating device including (i) a source of light having said certain wavelength, (ii) a layer of superconductive material through which light from said source must pass before it can reach the device's output, said superconductive material being switchable between a superconducting state in which said light can not pass and a non-superconducting state in which said light can pass, and (iii) an arrangement for switching said superconducting material between its superconducting and non-superconducting states in a way which provides said light pulses at the output of the device, said plate assembly comprising:

(a) a support member including at least one section thereof through which said light pulses can pass;

(b) said layer of superconductive material, the latter being supported by said support member, said superconductive material including first and second contact segments for receiving electrical contacts and a third light impinging segment, all of which are electrically connected together; and (c) means for preventing light from said source from reaching the output of said light modulating device by passing through said contact segments of said superconductive material irrespective of its superconducting or non-superconducting states while allowing said material to pass light through its light impinging segment and said one section of said support member and reach said output when the material is in its non-superconducting state.

30. A superconductive plate assembly according to claim 29 wherein the surface area defined by each of said contact segments of said superconductive material is larger than the surface area defined by said light impinging segment.

31. A superconductive plate assembly according to claim 30 wherein said contact and light impinging segments together define an H-shaped configuration where said light impinging segment serves as the cross-bar of the H-shape.

32. A superconductive plate assembly according to claim 31 wherein said support plate is a light transmissive support plate having one surface thereof for supporting said H-shaped superconductive material and also supporting said light preventing means.

33. A superconductive plate assembly according to claim 31 wherein said support plate is a light opaque support plate having one surface thereof for supporting said H-shaped superconductive material and at least in part serving as said light preventing means, said support plate including said one section thereof for allowing light passing through the light impinging segment of said superconductive material to pass through the plate also and reach the output of said light modulating device.

34. A method of transmitting data comprising the steps of:

(a) providing a light modulating device having an output and generating at its output a train of light pulses which is of a given wavelength and which contain data;

(b) changing the wavelength of said train of light pulses; and (c) directing said wavelength changed pulses into a fiber optic link for transmission away from said light modulating device;

wherein said light modulating device includes:

(d) a source of light having a given wavelength, (e) a layer of superconducting material through which light from said source must pass before it can reach the device's output, said superconductive material being switchable between a superconducting state in which said light can not pass and a non-superconducting state in which said light can pass, and (f) an arrangement for switching said superconducting material between its superconducting and non-superconducting states in a way which provides said light pulses at the output of the device.

35. A method according to claim 34 wherein the wavelength of the light pulses at the output of said light modulating device is approximately 2 microns and wherein said wavelength changing device reduces the wavelength of said pulses to between approximately 0.5 and 2 microns.

36. A superconductive plate assembly especially suitable for use in a light modulation system which includes a light modulating device having an output and providing at its output a train of light pulses, each of which has a certain wavelength, said light modulating device including (i) a source of light having said certain wavelength, (ii) a layer of superconductive material through which light from said source must pass before it can reach the device's output, said superconductive material being switchable between a superconducting state in which said light can not pass and a non-superconducting state in which said light can pass, and (iii) an arrangement for switching said superconducting material between its superconducting and non-superconducting states in a way which provides said light pulses at the output of the device, said switching means including means for directing an electrical current through said superconducting material in a predetermined way so as to switch at least a portion of said material between said states to provide said light pulses, said plate assembly comprising:

(a) a support member including at least one section thereof through which said light pulses can pass; and (b) said layer of superconductive material, the latter being supported by said support member, said superconductive material being configured such that when a current of a predetermined magnitude passes through it in said predetermined way when the latter is in its superconducting state, only a predetermined portion thereof switches to its non-superconducting state in response thereto, said predetermined portion being in optical alignment with said one section of said support member, whereby light from said source is able to reach the output of said light modulating device though said portion and one section only.

37. A superconductive plate assembly especially suitable for use in a light modulation system which includes a light modulating device having an output and providing at its output a train of light pulses, each of which has a certain wavelength, said light modulating device including (i) a source of light having said certain wavelength, (ii) a layer of superconductive material through which light from said source must pass before it can reach the device's output, said superconductive material being switchable between a superconducting state in which said light can not pass and a non-superconducting state in which said light can pass, and (iii) an arrangement for switching said superconducting material between its superconducting and non-superconducting states in a way which provides said light pulses at the output of the device, said switching means including means for directing an electrical current of different first and second magnitudes through said superconducting material in a predetermined way so as to switch at least different portions of said material between said states to provide said light pulses, said plate assembly comprising:

(a) a support member including at least one section thereof through which said light pulses can pass; and (b) said layer of superconductive material, the latter being supported by said support member, said superconductive material being configured such that when a current of said different magnitudes pass through it in said predetermined way when the latter is in its superconducting state, first and second portions thereof respectively switch to its non-superconducting state in response to said different current magnitudes, said first and second portions being in optical alignment with said one section of said support member, whereby light from said source is able to reach the output of said light modulating device though either of said portions and one section only.

38. A light modulation system according to claim 37 wherein said different current magnitudes include a first current magnitude and a second higher current magnitude and wherein said different portions of said third segment include a first portion and a second larger portion which includes said first portion.

39. A light modulation system according to claim 37 wherein said different current magnitudes include a first current magnitude and a second higher current magnitude and wherein said different portions of said third segment include a first portion and a second distinctly different portion.

* * * * *